Sept. 6, 1955          G. O. WRAY ET AL          2,716,974
                          GAS FURNACE
                       Filed Jan. 30, 1952

INVENTORS
George O. Wray
Fred E. Wilson
BY
Arthur R. Woolfolk
Attorney

United States Patent Office 2,716,974
Patented Sept. 6, 1955

2,716,974

GAS FURNACE

George O. Wray and Fred E. Wilson, Milwaukee, Wis.

Application January 30, 1952, Serial No. 269,024

2 Claims. (Cl. 126—109)

This invention relates to furnaces and is particularly directed to a gas furnace.

Objects of this invention are to provide a novel type of furnace in which the heated products of combustion are caused to uniformly sweep over the heat transferring sections of the furnace and to be drawn centrally from the furnace so that there is no uneven flow of the products of combustion in any portion of the furnace.

Further objects are to provide a gas furnace in which the products of combustion are caused to pass over both the inner and outer surfaces of a vertically disposed centrally located annular drum through which air to be heated is passed, and are also caused to pass downwardly on the outer side of a plurality of air pipes through which additional air to be heated is passed, and in which the products of combustion are finally caused to pass centrally upwardly from the furnace.

Further objects for one form of the invention are to provide a baffle for separating upwardly and downwardly flowing products of combustion and to so construct this baffle that it is composed jointly of a vertical wall and of vertically arranged air pipes formed as a unitary structure with such wall.

Further objects are to provide a gas furnace in which the burner is formed of two semicircular elements which may be readily removed through the front opening of the furnace without dismantling any portion of the furnace.

Further objects are to provide a gas furnace in which high efficiency is obtained and in which a very large percent of the heat generated by the combustion of the gas is delivered to the air to be heated.

Embodiments of the invention are shown in the accompanying drawings in which.

Figure 1:
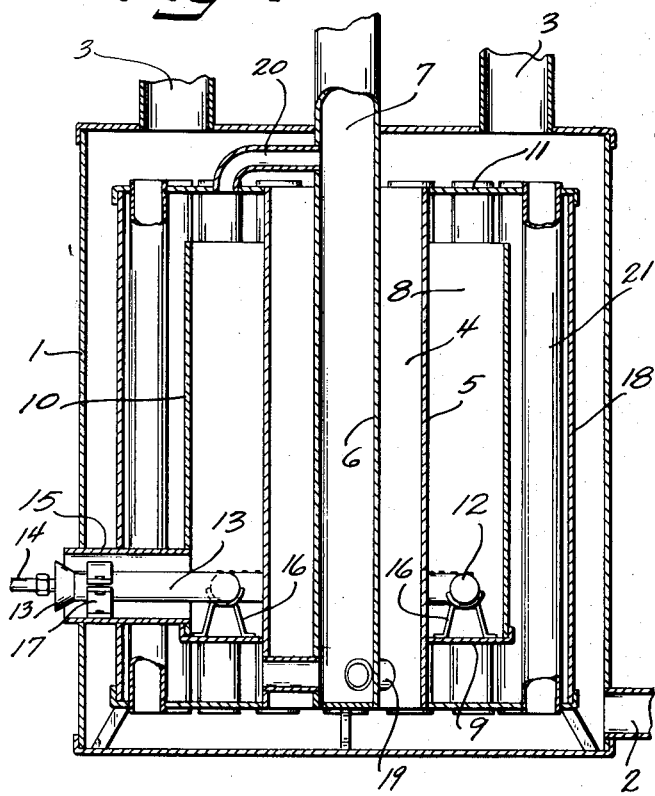
Figure 1 is a vertical sectional view through one form of the invention.
Figure 2:
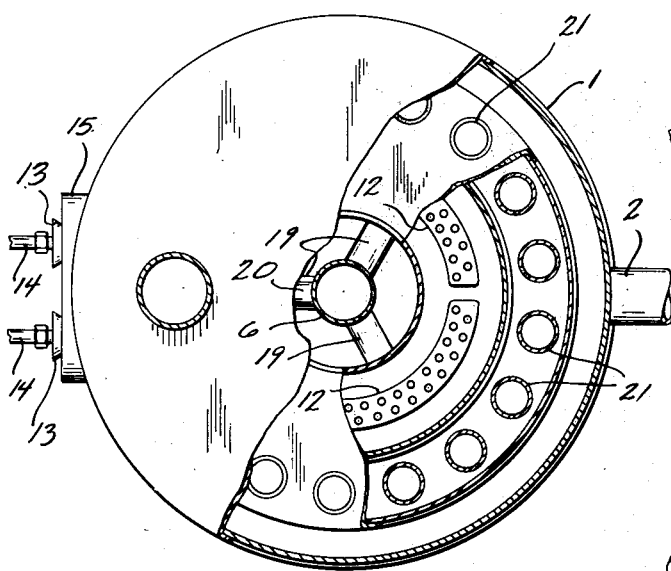
Figure 2 is a plan view with parts broken away and parts in section.

Referring to Figures 1 and 2, it will be seen that the furnace comprises an outer shell or casing 1 which is provided with one or more cold air inlets 2 and one or more hot air outlets 3.

The furnace comprises an annular centrally located vertical air drum 4 through which air to be heated is adapted to pass. This drum is composed of an outer wall 5 and the wall 6 of the smoke pipe or exhaust pipe 7 for the products of combustion.

The combustion chamber is indicated by the reference character 8 and is provided with a bottom portion 9 and an annular baffle 10 which extends upwardly and terminates at a point spaced below the top 11 of the furnace. In the lower portion of the combustion chamber 8 a gas burner 12 is positioned. This gas burner is composed of two portions as may be seen from Figure 2 which have outwardly projecting neck portions 13 into which the gas nozzle or gas pipes 14 project in the usual manner. The portions 13 are adapted to supply the primary air for the combustion of the gas. The secondary air is supplied through the radially extending casing 15 in which the necks 13 of the burner's half section 12 are positioned.

The semicircular sections of the burner 12 are removably supported by brackets 16. The straight or neck portions 13 of the burner are detachably held by clamps or brackets 17. This construction allows the ready removal of each half section of the burner by merely releasing the clamp or bracket 17 and thereafter drawing the section outwardly through the portion 15 of the furnace.

If desired a suitable covering for a part of the front of the casing 15 may be provided in the form of a flap in accordance with the usual construction. However, this last feature forms no portion of the invention and has not been illustrated.

The actual shell or casing 18 of the furnace is spaced from the outer shell 1 enclosing the furnace proper.

The products of combustion pass upwardly from the burner 12 and downwardly on the outer side of the annular baffle 10. The products of combustion continue downwardly below the bottom 9 of the combustion chamber and pass through radially disposed tubes 19 into the lower portion of the smoke pipe 7. The products of combustion pass upwardly directly vertically from the furnace. It is preferable to provide a vent 20 which is relatively small and which joins the upper portion of the furnace immediately above the combustion chamber 8 with the smoke pipe or exhaust pipe 7, in accordance with the usual practice for gas furnaces.

A plurality of vertically arranged air pipes 21 are positioned in the space between baffle 10 of the combustion chamber and the wall 18 of the furnace. Air passes upwardly through these pipes 21 and also passes upwardly through the annular vertical air drum 4 and between the casings 18 and 1. It is to be noted that the inner side of the combustion chamber 8 is in direct contact with the air passing upwardly through the vertically located annular air drum 4 and the downwardly traveling products of combustion are in direct contact with the vertically arranged air tubes 21 and the shell 18.

The arrangement of the travel of the products of combustion and the air to be heated is somewhat similar to that disclosed in the prior Patent No. 2,470,420 of May 17, 1949, for Pot Type Oil Burner Air Heating Furnace issued to Fred E. Wilson, one of the joint inventors in the present invention. However, in the present construction, the vertically located annular air drum 4 is provided so that the inner wall of the combustion chamber is air cooled by the air which travels freely upwardly through the vertically located annular air drum 4.

Figure 3:
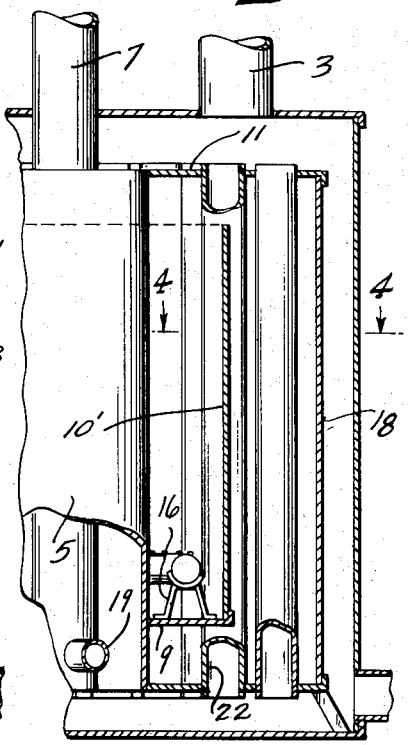
Figure 3 is a fragmentary view corresponding to Figure 1 showing a further form of the invention, such view corresponding to a section on the line 3—3, of Figure 4.
Figure 4:
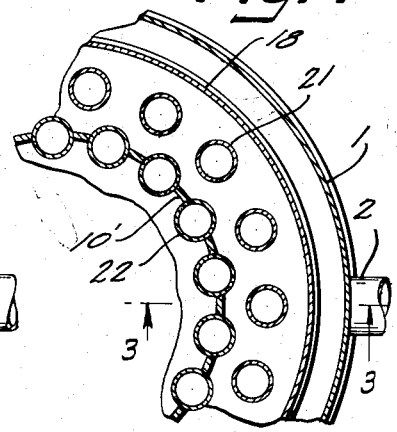
Figure 4 is a sectional view on the line 4—4 of Figure 3.

In the second form of the invention, shown in Figures 3 and 4, susbtantially the same construction as that described for the first form is employed. The primary differences between the two forms of the invention is that the baffle 10' on the outer side of the combustion chamber 8 is formed jointly as a wall and as a series of pipes or air tubes 22 as shown most clearly in Figure 4. In this way the baffle 10' is itself air cooled as the heat from the baffle is transmitted to the air passing upwardly through the pipe 22. The remaining portions of the furnace are the same as that previously described.

It will be seen that novel forms of gas furnaces have been provided by this invention in which the wall of the combustion chamber is air cooled by the air passing vertically upwardly through the centrally located annular air drum. Further, for the form shown in Figures 3 and 4, it will be seen that the baffle for the combustion chamber is also air cooled by the air passing upwardly through the pipes forming a portion of this baffle.

In all forms of this invention it is to be noted that a very extensive contact is afforded between the heated walls and the air to be heated so that a high degree of heat transfer is obtained and consequently a high efficiency results.

From actual tests conducted with a furnace constructed in accordance with this invention it has been found that remarkable economy is obtained and a very even flow of the products of combustion is obtained without any dead or non-circulating pockets.

Although this invention has been described in considerable detail, it is to be understood that such description is intended as illustrative rather than limiting, as the invention may be variously embodied and is to be interpreted as claimed.

We claim:

1. A furnace comprising a combustion chamber having an annular inner wall and an annular outer wall surrounding said annular inner wall and spaced therefrom and having a main bottom and a main top wall extending from said annular inner wall to said annular outer wall, said combustion chamber having an annular baffle spaced from said main top wall and main bottom wall and having an auxiliary annular bottom wall spaced from said main bottom wall and extending from said inner wall to the lower end of said baffle, said furnace having a centrally located discharge chamber surrounded by said combustion chamber and having a closed bottom and an outer wall spaced from the inner annular wall of said combustion chamber thereby providing an annular auxiliary chamber, said annular auxiliary chamber being open top and bottom for the upward passage of air to be heated, an annular burner located inwardly of said baffle and above said auxiliary annular bottom wall, said baffle and said inner wall defining the primary combustion chamber and said baffle allowing the products of combustion to pass downwardly between said baffle and said outer wall, means located below the baffle and placing the lower portion of said combustion chamber in communication with said centrally located discharge chamber, and an outer shell surrounding said combustion chamber and spaced therefrom and having air inlet and air outlet means, said baffle having a plurality of spaced air pipes forming a unitary portion therewith and passing through the combustion chamber and opening exteriorly of the combustion chamber at points above and below the combustion chamber and allowing air to pass upwardly from a point below said combustion chamber and to discharge at a point above said combustion chamber.

2. A furnace comprising a combustion chamber having an annular inner wall and an annular outer wall surrounding said annular inner wall and spaced therefrom and having a main bottom and a main top wall extending from said annular inner wall to said annular outer wall, said combustion chamber having an annular baffle spaced from said main top wall and main bottom wall and having an auxiliary annular bottom wall spaced from said main bottom wall and extending from said inner wall to the lower end of said baffle, an annular burner located inwardly of said baffle and above said auxiliary annular bottom wall, a centrally located discharge chamber for the products of combustion located inwardly of and in spaced relation to the inner wall of said combustion chamber, said discharge chamber having an outer wall forming with the inner wall of said combustion chamber an annular auxiliary chamber, said annular auxiliary chamber being open top and bottom for the upward passage of air to be heated, means located below the baffle and placing the lower portion of said combustion chamber in communication with said centrally located discharge chamber, and an outer shell surrounding said combustion chamber and spaced therefrom and having air inlet and air outlet means, said baffle having a plurality of spaced air pipes forming a unitary portion therewith and passing through the combustion chamber and opening exteriorly of the combustion chamber at points above and below the combustion chamber and allowing air to pass upwardly from a point below said combustion chamber and to discharge at a point above said combustion chamber.

References Cited in the file of this patent

UNITED STATES PATENTS

| Number | Name | Date |
|---|---|---|
| 110,731 | Bonnell | Jan. 3, 1871 |
| 523,672 | Long | July 31, 1894 |
| 717,502 | Jones | Dec. 30, 1902 |
| 773,542 | Cass | Nov. 1, 1904 |
| 955,308 | Bean | Apr. 19, 1910 |
| 2,470,420 | Wilson | May 17, 1949 |